(12) United States Patent  
Vendryes

(10) Patent No.: US 6,546,259 B1
(45) Date of Patent: Apr. 8, 2003

(54) METHOD AND SYSTEM FOR AUTONOMOUS TWO-WAY RADIO FREQUENCY COMMUNICATION

(75) Inventor: Robert S. Vendryes, Evergreen, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 309 days.

(21) Appl. No.: 09/595,915

(22) Filed: Jun. 20, 2000

(51) Int. Cl.$^7$ .................................................. H04B 7/00
(52) U.S. Cl. ........................ 455/513; 455/428; 455/445
(58) Field of Search ................................. 455/513, 445, 455/447, 448, 449, 524, 67.1, 67.3, 115, 427, 428, 429, 430, 431

(56) References Cited

U.S. PATENT DOCUMENTS

| 4,599,734 | A |   | 7/1986  | Yamamoto ................ 375/40   |
|-----------|---|---|---------|-----------------------------------|
| 5,204,981 | A |   | 4/1993  | Karasnwa et al. ........ 455/277.1 |
| 5,335,356 | A | * | 8/1994  | Andersson ................ 455/54.1 |
| 5,349,360 | A |   | 9/1994  | Matsui ....................... 342/374 |
| 5,537,679 | A |   | 7/1996  | Crosbie et al. ............. 455/132 |
| 5,583,517 | A |   | 12/1996 | Yokev et al. ............... 342/457 |
| 5,594,454 | A |   | 1/1997  | Devereux et al. .......... 342/357 |
| 5,641,134 | A |   | 6/1997  | Vatt ........................... 244/158 |
| 5,678,175 | A |   | 10/1997 | Stuart et al. ............... 455/13.1 |
| 5,777,580 | A |   | 7/1998  | Janky et al. ............... 342/457 |
| 5,787,122 | A |   | 7/1998  | Suzuki ....................... 375/267 |
| 5,793,813 | A |   | 8/1998  | Cleave ....................... 375/259 |
| 5,799,245 | A |   | 8/1998  | Ohashi ........................ 455/69 |
| 5,802,241 | A |   | 9/1998  | Oshima ........................ 386/46 |
| 5,828,347 | A |   | 10/1998 | Rossi et al. ................. 343/882 |
| 5,832,379 | A |   | 11/1998 | Mallinchrodt ............... 455/427 |
| 5,889,474 | A |   | 3/1999  | LaDue ................... 340/825.49 |
| 5,903,835 | A |   | 5/1999  | Dent ........................... 455/427 |
| 5,918,157 | A | * | 6/1999  | Wiedeman et al. ........ 455/13.1 |
| 5,927,648 | A |   | 7/1999  | Woodland ................ 244/118.1 |
| 5,937,001 | A |   | 8/1999  | Shockey ..................... 375/200 |
| 6,067,442 | A | * | 5/2000  | Wiedeman et al. ........ 455/13.1 |
| 6,311,056 | B1| * | 10/2001 | Sandidge ..................... 455/414 |

* cited by examiner

*Primary Examiner*—Daniel Hunter
*Assistant Examiner*—Thuan T. Nguyen
(74) *Attorney, Agent, or Firm*—Marsh Fischmann & Breyfogle LLP

(57) ABSTRACT

A method and system for autonomous two-way RF communication between a launch vehicle and at least one receiving or tracking station. Detection circuitry continuously determines the identity of the optimum receiving or tracking station (ground, sea, airborne, or satellite) and selects the best launch vehicle transmission antenna to close the RF telemetry link. The method and system is designed to simultaneously transmit and receive RF signals. The antenna system includes a telemetry transmission link and an antenna selection link. Antenna selection link signals received by each antenna element on the launch vehicle are provided via RF couplers to a receiver for signal strength and modulation signal detection. The telemetry transmission link communicates with a receiving or tracking station by using a transmitter to drive one of two or more switched antennas mounted on the surface of the launch vehicle having the current higher signal strength.

34 Claims, 7 Drawing Sheets

METHOD AND SYSTEM FOR AUTONOMOUS TWO-WAY RADIO FREQUENCY COMMUNICATION

FIELD OF THE INVENTION

This invention generally relates to a method and system for radio frequency communication, and more particularly, to a method and system for autonomous two-way radio frequency communication between at least one first station and a second station.

BACKGROUND OF THE INVENTION

In the launch vehicle industry, radio frequency (RF) telemetry signals are transmitted from the launch vehicle to one or more ground, sea, air, or space-based receiving or tracking stations to thereby indicate data on the performance, health, and status of various monitored parameters of the launch vehicle to launch personnel. In this regard, closure of the one-way RF telemetry link between the launch vehicle and the receiving or tracking station is typically accomplished by using brute-force methods. Such methods include high power transmitters and omni-directional antennas on the launch vehicle, pre-launch software coding to control the launch vehicle antenna steering and transmit antenna selection during the mission, and low telemetry data modulation rates.

For example, an omni-antenna provides line-of-sight coverage over a broad range of angles off of the antenna bore sight. An omni-directional design allows a combined two antenna arrangement to cover most of 360° laterally around a launch vehicle. However, the peak gain performance of omni-antennas is very low, typically around 5 db, and provides minimum coverage towards the nose and tail of a launch vehicle. In addition, the design assumes a minimum gain over 95% of the surface of the transmit antenna radiation sphere. This gain number, typically on the order of −13 db for S-Band frequencies, is then used to predict the communication link margin performance and drive the requirements of the other telemetry system components. An over-designed method such as this can drive overall cost of the system by requiring higher power transmitters and reductions in allowable data transmission rates. This lower antenna gain approach may result in earlier loss of the telemetry signal from the launch vehicle in the case of a launch anomaly or a non-nominal trajectory.

One major consideration in the efforts to maintain a communication link is that the pointing angle between the launch vehicle transmit antennas and the tracking station receive antennas varies continuously throughout the mission. For example, in the launch vehicle industry, most RF signals require line-of-sight geometry between the tracking station receive antenna and the launch vehicle transmit antenna to process the RF signal. However, ensuring that line-of-sight geometry is maintained throughout the mission is extremely difficult, especially during anomalous or non-predicted launch vehicle trajectories and orientations.

SUMMARY OF THE INVENTION

Accordingly, it is an object of the present invention to provide a method and system for autonomous two-way radio frequency communication.

It is another object of the present invention to provide a method and system for autonomous two-way radio frequency communication between at least one first station, such as a tracking station, and a second station, such as a launch vehicle.

It is a further object of the present invention to provide a method and system for autonomous two-way radio frequency communication that minimizes pre-flight analysis, pre-planning, and software coding efforts.

It is still another object of the present invention to provide a method and system for autonomous two-way radio frequency communication that maximizes telemetry data reception by a tracking station for the maximum time possible during a launch vehicle mission.

It is yet another object of the present invention to provide a method and system for autonomous two-way radio frequency communication that can transmit more telemetry data at higher transmission rates over existing systems.

The present invention achieves one or more of these objects by providing a method and system for autonomous two-way radio frequency communication between at least one receiving or tracking station (e.g., a first station) and a launch vehicle (e.g., a second station). Generally, in one aspect of the present invention, the two-way radio frequency communication system includes the second station which may receive unique RF signals in at least first and second antennas, or, in three, four, five, six, or any number of additional antennas (or antenna elements) that are positioned on the second station. A processor determines which of the first and second antennas, and any additional antennas, has the higher signal strength. A transmitter, located on the second station, is adapted to transmit telemetry signals over the antenna that received the unique RF signal that had the higher signal strength.

The telemetry signals contain data on monitored parameters of the launch vehicle. Once transmitted by the transmitter via the connected antenna, the telemetry signals may be received in the one or more first stations that transmitted the unique RF signals to the second station. Throughout the launch vehicle mission the transmitter output signal is repeatedly switched to the particular antenna that currently is receiving the unique RF signal having the higher signal strength, which is at that moment the best RF communication link between the first station and the second station. Thus, the peak gain of that particular launch vehicle antenna at that moment is more aligned with the peak gain of the first station receiving antenna. Selecting the antenna with the higher signal strength as the transmit antenna helps ensure that the telemetry signals transmitted are more likely to be received in the first station for evaluation by launch personnel.

In another aspect of the two-way radio frequency communication system, the system includes the second station which may receive unique RF signals in at least a first receive antenna, or, in two, three, four, five, six, or any number of additional receive antennas that are positioned on the second station. The receive antennas in this embodiment are adapted to scan for and receive the unique RF signals transmitted from the one or more first stations. A phased array antenna would be an example of such an antenna.

A processor determines which of the receive phased array antennas has the best quality signal vector, which is an indication of the best RF communication link between the first station and the second station. A transmitter located on the second station is adapted to radiate telemetry signals over at least a first transmit antenna to the first station along a path parallel to the best quality signal vector. Such a first transmit antenna may also be a phased array antenna. There may be two, three, four, or any number of transmit phased array antennas located on the second station. Transmitting telemetry data along a path parallel to the best quality signal vector helps ensure that the telemetry signals transmitted by the transmitter via the connected transmit phased array antenna are more likely to be received in the first station for evaluation by launch personnel.

Generally, in one aspect of the two-way radio frequency communication method of the present invention, the method includes the steps of transmitting a unique RF signal from a first station, receiving the unique RF signal with at least first and second antennas on the second station, determining a first signal strength for the unique RF signal received in the first antenna, determining a second signal strength for the unique RF signal received in the second antenna, determining which of the first and second signal strengths is higher, connecting a transmitter on the second station to whichever first or second antenna received the unique RF signal with the higher signal strength, and transmitting with the transmitter a first telemetry signal containing monitored parameters of the second station over the connected first or second antenna.

For purposes of facilitating communication, and otherwise avoiding loss of the RF telemetry link, in one embodiment of the method of the present invention, the radio frequency signals are transmitted from at least one ground station and at least one non-ground station. Telemetry signals transmitted from the launch vehicle may be received in either or both of the at least one ground station or the at least one non-ground station. Thus, as the second station moves along its mission path in relationship to the at least one ground station and the at least one non-ground station, the method of the present invention continually selects the antenna on the second station for transmitting telemetry data that has the best RF communication link to one or the other of the at least one ground station or the at least one non-ground station.

In another embodiment of the method of the present invention, the step of connecting the transmitter to the first or second antenna includes an optimizing step of applying a smoothing algorithm, which is executed within a processor. The smoothing algorithm inhibits switching between the first and second antennas if the change in the higher signal strength between the first and second antennas is less than a selected absolute change amount. This inhibits rapid and unnecessary switching between antennas.

DETAILED DESCRIPTION OF THE INVENTION

Figure 1:
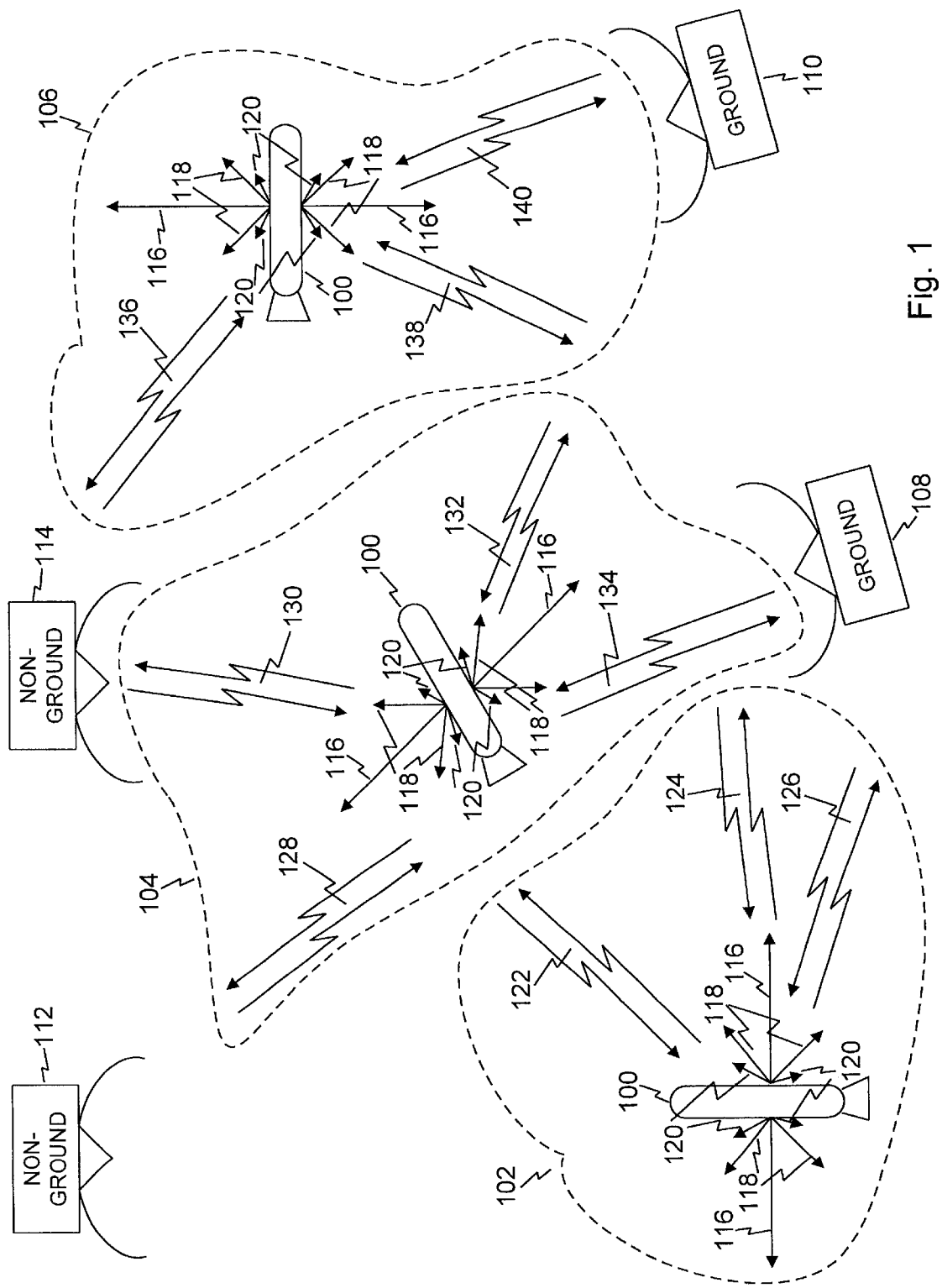
FIG. 1 shows a notional diagram of the two-way transmission links between a launch vehicle having a two-omni-antenna-element transmit coverage pattern and various receiving or tracking stations of the system of the present invention.
Figure 2:
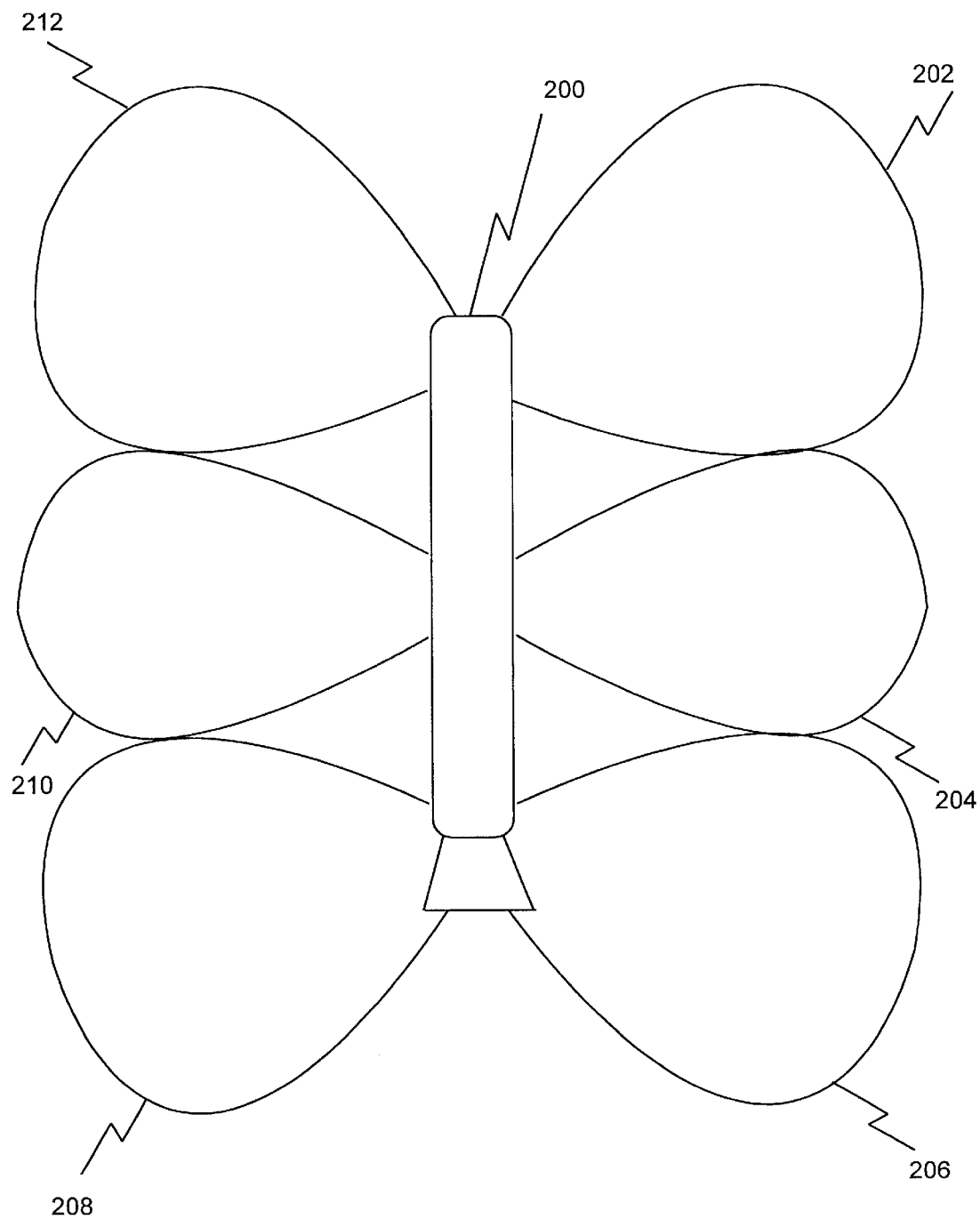
FIG. 2 shows a notional diagram of a launch vehicle cycling through a six-antenna-element narrow-beam transmit coverage pattern of the method and system of the present invention.

FIG. 1 shows a notional diagram of the two-way transmission links between a launch vehicle having a two-omni-antenna-element transmit coverage pattern and various receiving or tracking stations of the system of the present invention. One skilled in the art will recognize that the launch vehicle could have more than two antenna elements, and the antenna elements may also be narrow-beam. Narrow-beam antennas are designed to operate over a particular beam width such as a ±30° cone as shown in FIG. 2. Over this beam width the antenna is designed to radiate RF with a minimum gain of −10 db. The beam width of the antenna is inversely proportional to the antenna gain, i.e., the wider the beam width, the lower the peak gain of the antenna beam. In order for the RF communication system to operate with the highest efficiency, the peak gain region of the transmit narrow-beam antenna element should be line-of-sight with the receive antenna peak gain.

Referring now to FIG. 1, launch vehicle 100 is shown in three phases of flight: launch phase 102, ascent phase 104, and orbit phase 106 in relation to ground stations 108 and 110 and non-ground stations 112 and 114. Ground stations 108 and 110 may be stationary within a building or other fixed structure, or movable on a truck, on a rail car, or a ship at sea. Non-ground stations 112 and 114 may be satellites moving in relation to the ground or in geosynchronous orbit. Non-ground stations 112 and 114 may also be airborne stations housed in airplanes in flight. In FIG. 1, ground stations 108 and 110 are stationary within buildings, and non-ground stations 112 and 114 are satellites in geosynchronous orbit. One skilled in the art will recognize that more ground and non-ground stations may be utilized, but only ground stations 108 and 110, and non-ground stations 112 and 114, are shown in FIG. 1 for simplicity.

Arrows 116 represent the high gain signal from the 0 db part of the omni-antenna-element transmit coverage pattern. Arrows 118 represent the medium gain signal from the −10 db part of the omni-antenna-element transmit coverage pattern. Arrows 116 represent the low gain signal from the −20 db part of the omni-antenna-element transmit coverage pattern.

The present invention employs two-way radio frequency communication between launch vehicle 100 and ground stations 108 and 110 and non-ground stations 112 and 114. The system may be tuned for any frequency but operation is assumed to be at typical telemetry range frequencies from 2.2–2.3 GHz. Whenever launch vehicle 100 is in a position to transmit to any of non-ground stations 112 and 114 and/or ground stations 108 and 110, it is able to receive a signal from any of non-ground stations 112 and 114 and/or ground stations 108 and 110 as well. Part of the two-way radio frequency communication system is used as a verification link. Non-ground stations 112 and 114 and/or ground stations 108 and 110 are tasked with transmitting a unique RF signal that is identified in launch vehicle 100.

In launch phase 102, two-way communication is represented by arrow pairs 122, 124, and 126. Non-ground stations 112 and 114 and ground stations 108 and 110 transmit the unique RF signal to be identified in launch vehicle 100. Launch vehicle 100 transmits telemetry data to be received by non-ground stations 112 and/or 114, and/or ground stations 108 and/or 110.

Arrow pair 122 shows two-way communication between launch vehicle 100 and non-ground station 114. Arrow pair 124 shows two-way communication between launch vehicle 100 and ground station 110. Arrow pair 126 shows two-way communication between launch vehicle 100 and ground station 108. No operative RF communication link is possible between launch vehicle 100 and non-ground station 112 due to their orientation in relation to each other in launch phase 102.

In ascent phase 104, two-way communication is represented by arrow pairs 128, 130, 132, and 134. Arrow pair 128 shows two-way communication between launch vehicle 100 and non-ground station 112. Arrow pair 130 shows two-way communication between launch vehicle 100 and non-ground station 114. Arrow pair 132 shows two-way communication between launch vehicle 100 and ground station 110. Arrow pair 134 shows two-way communication between launch vehicle 100 and ground station 108.

In orbit phase 106, two-way communication is represented by arrow pairs 136, 138, and 140. Arrow pair 136 shows two-way communication between launch vehicle 100 and non-ground station 114. Arrow pair 138 shows two-way communication between launch vehicle 100 and ground station 108. Arrow pair 140 shows two-way communication between launch vehicle 100 and ground station 110. No operative RF communication link is possible between launch vehicle 100 and non-ground station 112 due to their orientation in relation to each other in orbit phase 106.

FIG. 2 shows a notional diagram of a launch vehicle cycling through a six-antenna-element narrow-beam transmit coverage pattern of the method and system of the present invention. Referring now to FIG. 2, at any given point in time during the mission, launch vehicle 200 may be receiving unique RF signals from one or more ground stations and/or one or more non-ground stations. During a launch and orbit operation, each telemetry receiving or tracking station, ground or non-ground, is configured to transmit a unique verification RF signal. Various techniques may be employed to transmit the unique RF signal, such as frequency hopping, or modulating the RF signal with a specific handshake bit stream. One skilled in the art will recognize that many other suitable techniques could also be employed to transmit the unique RF signal.

In this embodiment, launch vehicle 200 has a six-antenna-element narrow-beam transmit coverage pattern represented by transmit coverage patterns 202, 204, 206, 208, 210, and 212. The method and system for autonomous two-way radio frequency communication of the present invention constantly determines which of the six antenna elements is receiving the strongest RF signal. This continuous monitoring of received signal strength from all antenna elements combined with identifying the unique RF signal is used to identify the optimal antenna element to transmit telemetry signals back to the receiving ground or non-ground station.

For example, at any particular discrete period of time during the mission, launch vehicle 200 may be receiving modulated RF signals having the correct handshake bit stream over antenna elements associated with transmit coverage patterns 204, 206, and 208. If the modulated RF signal received by the antenna element associated with transmit coverage pattern 206 over the discrete period of time is the strongest, then this antenna element will be selected by the method and system of the present invention to transmit the telemetry data from launch vehicle 200. At a next particular discrete period of time during the mission, launch vehicle 200 may be receiving modulated RF signals having the correct handshake bit stream over antenna elements associated with transmit coverage patterns 206, 208, and 210. If the modulated RF signal received by the antenna element associated with transmit coverage pattern 208 over the discrete period of time is the strongest, then this antenna element will be selected by the method and system of the present invention to transmit the telemetry data from launch vehicle 200.

Figure 3:
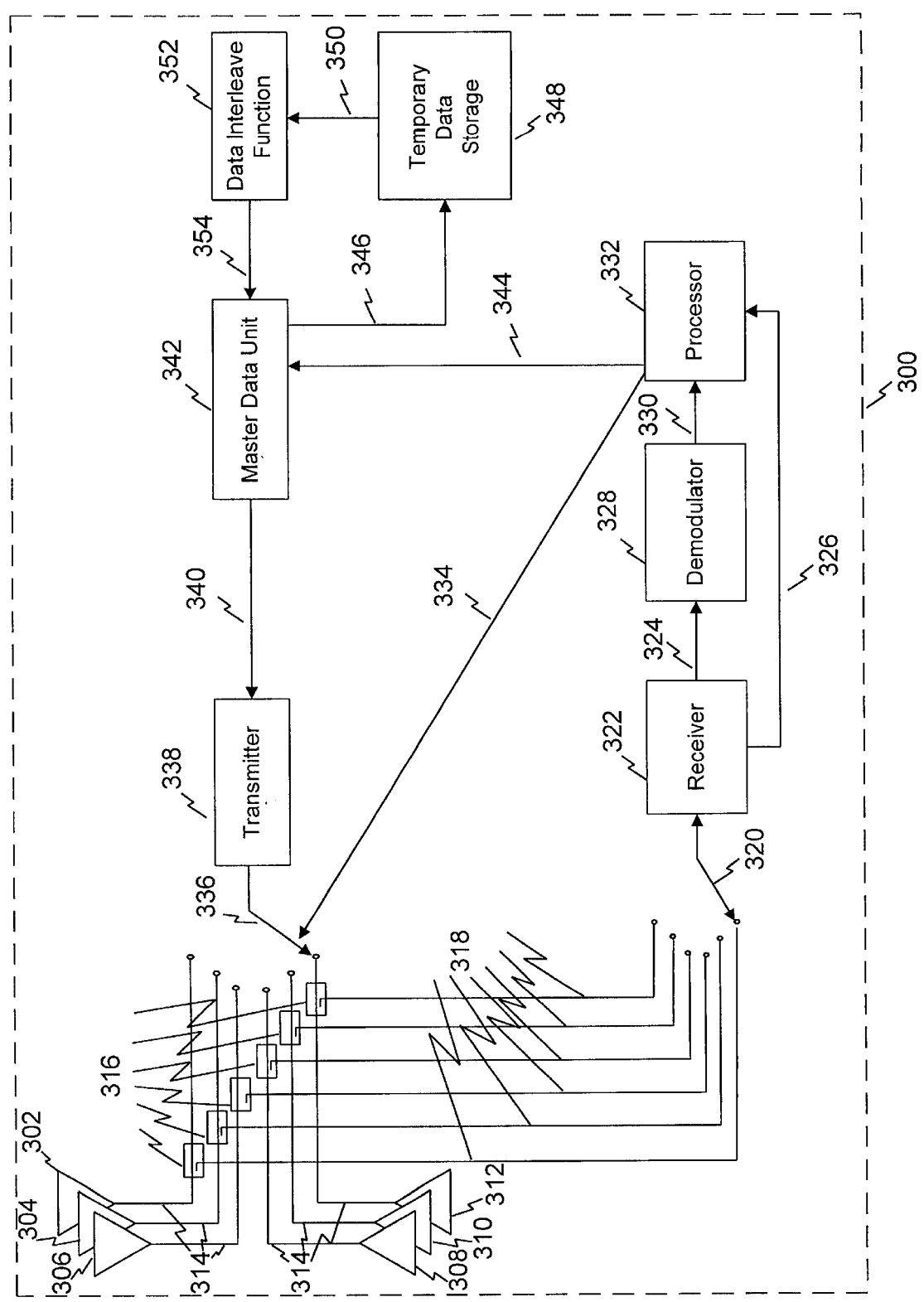
FIG. 3 shows a block diagram of the system for autonomous two-way radio frequency communication of the present invention for the launch vehicle of FIG. 2.

FIG. 3 shows a block diagram of the system for autonomous two-way radio frequency communication of the present invention for the launch vehicle of FIG. 2. One skilled in the art will recognize that the present invention requires at least two antenna elements located on the launch vehicle. More than two antenna elements may provide enhanced performance. Six antenna elements are shown in FIG. 3 as one embodiment of the invention. Referring now to FIG. 3, antenna system 300 is contained within launch vehicle 200 of FIG. 2. Antenna elements 302, 304, 306, 308, 310, and 312 are adapted such that when properly placed on launch vehicle 200 they yield the corresponding transmit coverage patterns 202, 204, 206, 208, 210, and 212 shown in FIG. 2. RF couplers 316 located on the cables 314 of antenna elements 302, 304, 306, 308, 310, and 312 couple the signals received by each of the antenna elements and route the signals over cables 318 through receiver switch 320 to receiver 322. Receiver switch 320 may be an electro-mechanical switch that has a throw that moves to physically connect one of antenna elements 302, 304, 306, 308, 310, and 312 at a time to receiver 322, or any other suitable type of switching device capable of routing the individual signals received by the antenna elements 302, 304, 306, 308, 310, and 312 to receiver 322.

Receiver 322 continuously monitors the signals received by each antenna element 302, 304, 306, 308, 310, and 312 through receiver switch 320. In one embodiment, receiver 322 is adapted to collect a single frequency signal that is modulated with a handshake bit stream. The frequency may be connector selectable to keep from interfering with other transmission activity in the area. Receiver 322 provides received signal strength output via path 326 to processor 332, and demodulation outputs via path 324 to demodulator 328. Processor 332 may also be a logic circuit or other suitable logic device adapted to process inputs from receiver 322.

In one embodiment of the invention, receiver switch 320 connects a first antenna element, such as antenna element 302, to receiver 322 for a selected period of time, typically a few microseconds. When successful demodulation of the RF signal occurs, and the correct handshake bit stream is detected, the demodulated signal is passed via path 330 to processor 332. The signal strength for the signal received on antenna element 302 is sent from receiver 322 via path 326 and stored in processor 332, or some other memory device (not shown in FIG. 3). If the correct handshake bit stream is not detected, the signal is ignored. The handshake bit stream length is selected short enough to allow for this rapid querying of each antenna element during the few microseconds each antenna element is connected to receiver 322. Receiver switch 320 then connects a next antenna element, such as antenna element 304, to receiver 322 for the selected period of time. This process is repeated until all antenna elements have been connected to receiver 322, and all signal strengths have been stored in processor 332, thus completing a first monitoring cycle. This monitoring cycle is repeated throughout the launch vehicle mission. In the case where no unique RF signal is detected for too long a period of time, a nominal antenna element or antenna element combination selected by the method and system of the present invention is used to provide a fallback or default transmission route for the telemetry data.

After each monitoring cycle, processor 332 is adapted to compare the signal strengths stored for the current monitoring cycle, and identify the antenna element with the higher received signal strength for the current monitoring cycle. This signal strength may be higher or lower than the previously determined higher signal strength from the previous monitoring cycle. Processor 332 then sends a command via path 334 to transmitter switch 336 to connect the antenna element with the higher signal strength for the current monitoring cycle to transmitter 338. After the next monitoring cycle, if the antenna element currently connected to transmitter 338 has a signal strength higher than a desired threshold compared to the current antenna element, processor 332 sends a command via path 334 to transmitter switch 336 to switch from the currently connected antenna element to the antenna element identified in the latest monitoring cycle with the higher signal strength. If the current antenna element is the same antenna element currently connected to transmitter 338, processor 332 does not send a command to transmitter switch 336 to make a switch. This antenna element selection process operates continuously throughout the duration of the launch vehicle mission.

In another embodiment of the system of the present invention, it is not necessary to store the signal strengths. Instead, after initially selecting one of the antenna elements to connect to transmitter 338, the signal strength for the next antenna element is compared to the signal strength of the antenna element currently connected to transmitter 332. If the new signal-strength is higher than a desired threshold, then processor 332 sends a command via path 334 to transmitter switch 336 to switch from the currently connected antenna element to the antenna element newly identified as having the higher signal strength. If the new signal strength is lower than a desired threshold, then processor 332 does not send a command to switch and the currently connected antenna element remains connected to transmitter 338.

In another embodiment of the system of the present invention there is no receiver switch. Instead, the output from each antenna element receiving the unique RF signal charges up a capacitor (not shown in FIG. 3). The stronger the signal that is being received, the larger the charge build up on the capacitor. Processor 332 monitors the charges on the capacitors, and sends a command via path 334 to transmitter switch 336 to switch to the antenna element having the higher capacitor charge. As the capacitor charges rise and fall with the rise and fall of received signal strength, processor 332 sends commands to transmitter switch 336 to switch to the antenna element having the current higher capacitor charge.

In another embodiment of the system of the present invention, a smoothing algorithm (not shown in FIG. 3) is executed within processor 332. The smoothing algorithm inhibits switching between antenna elements 302, 304, 306, 308, 310, and 312 if the change in the higher signal strength between the previously selected antenna element and the currently determined antenna element with the higher signal strength is less than a selected absolute change amount. For example, suppose antenna element 302 had been selected by processor 332 to transmit telemetry data because it had the previously determined higher signal strength. In the next evaluation, the signal strength of antenna element 302 may rise or fall based on changing conditions, or remain the same in the absence of changing conditions. If in the next evaluation processor 332 determines that antenna element 304 has the higher signal strength, and the absolute value of change in signal strength between antenna element 302 and antenna element 304 is 2 db or less, processor 332 does not issue a new selection command and antenna element 302 remains selected for transmitting telemetry data. In other words, if the signal strength of antenna element 302 fell compared to its previous strength, and antenna element 304 has the current higher signal strength but is 2 db or less greater than the signal strength for antenna element 302, antenna element 302 remains selected for transmitting telemetry data. Or, if the signal strength of antenna element 302 rose compared to its previous strength, and antenna element 304 has the current higher signal strength but is 2 db or less greater than the signal strength for antenna element 302, antenna element 302 remains selected for transmitting telemetry data.

Master data unit 342 gathers the telemetry data generated by the various sensors located on the launch vehicle and sends the telemetry data via path 340 to transmitter 338. Transmitter 338 then transmits the telemetry data over the antenna element currently connected by transmitter switch 336 to transmitter 338.

There may be times when no receiving or tracking station antennas are within enough of a line-of-sight orientation with any of antenna elements 302, 304, 306, 308, 310, and 312, resulting in signal strengths too low to maintain an RF communication link. Telemetry data would be lost if transmitted during these times. To compensate for this problem, in another embodiment of the invention, the detection of the handshake bit stream in the received RF signal is time-tagged in order to identify which telemetry data would be lost if transmitted when no RF communication link exists or is likely to exist based on the measured signal strength. At such times, the telemetry data is temporarily stored for transmission at a later time after an RF communication link is re-established. For example, if the current higher signal strength is below a certain minimum value, processor 332 can note the time and send that information via path 344 to master data unit 342 to direct the telemetry data to temporary data storage 348 via path 346 instead of to transmitter 338. Temporary data storage 348 may be sized to handle the full telemetry data stream, or a subset of the most critical measurements. When the RF communication link recovers, the telemetry data in temporary data storage 348 may now be transmitted in one of several ways. Temporary data storage 348 may be a separate storage device, a memory buffer in processor 332, or any other suitable storage medium.

For example, the telemetry data in temporary data storage 348 may be sent via path 350 to data interleave program 352, which interleaves the telemetry data via path 354 with realtime telemetry data in master data unit 342 to allow transmission to the receiving or tracking stations. Data interleave program 352 may be executable on a separate device, or executable in processor 332. Alternatively, the telemetry data in temporary data storage 348 may be transmitted on a separate RF communication link.

Performance of the method and system for autonomous two-way radio frequency communication of the present invention can be optimized for a particular mission to select the best position, number, and shape of the antenna element transmit coverage patterns. In the simplest case, the antenna system can toggle between two antenna elements on the launch vehicle. One skilled in the are will recognize that this antenna system and method can be used with any number of antenna elements of two or more.

Figure 4A:
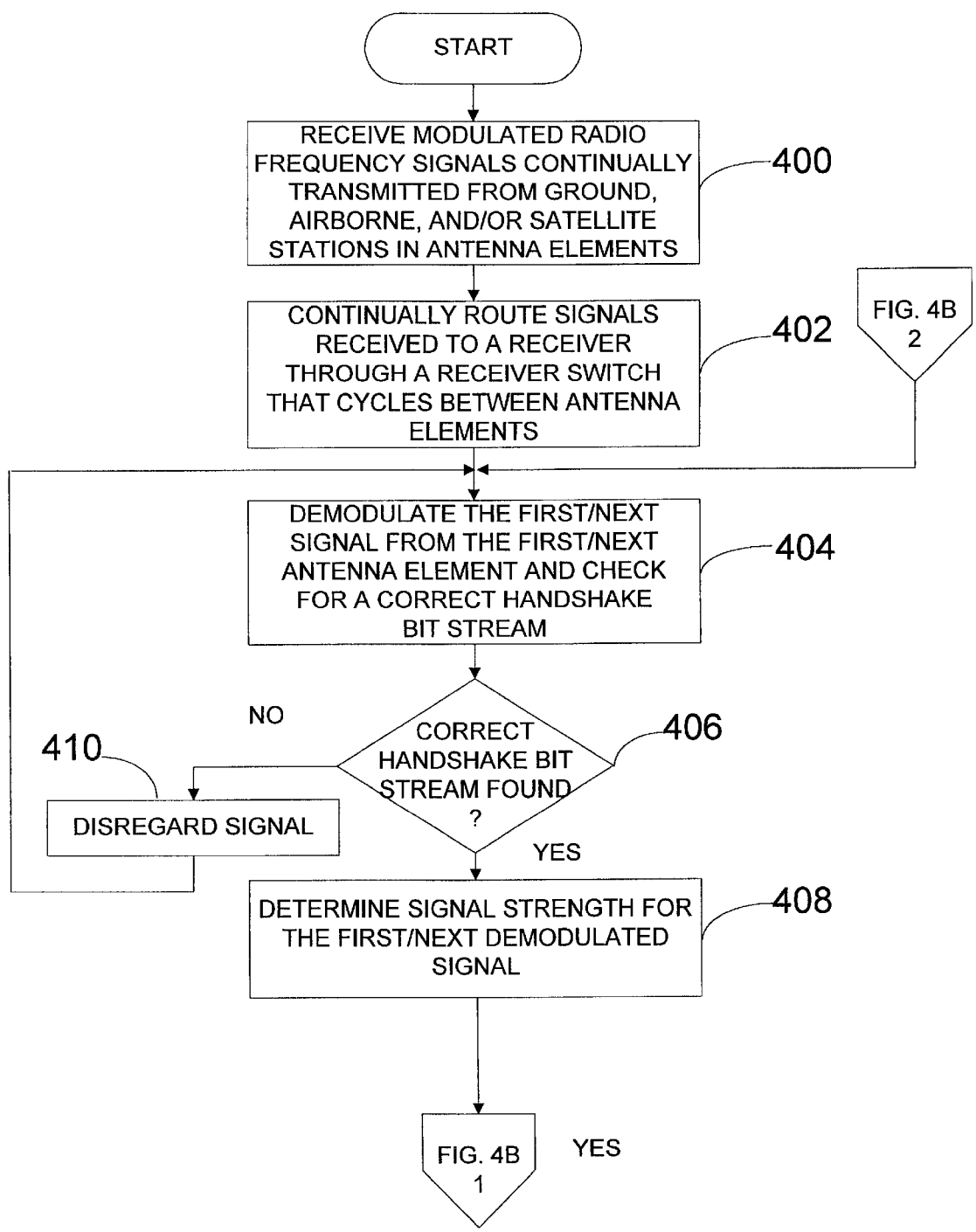
FIGS. 4A and 4B show a flow chart of an embodiment of the method for autonomous two-way radio frequency communication of the present invention for the launch vehicle of FIG. 2 that utilizes modulated RF signals.
Figure 4B:
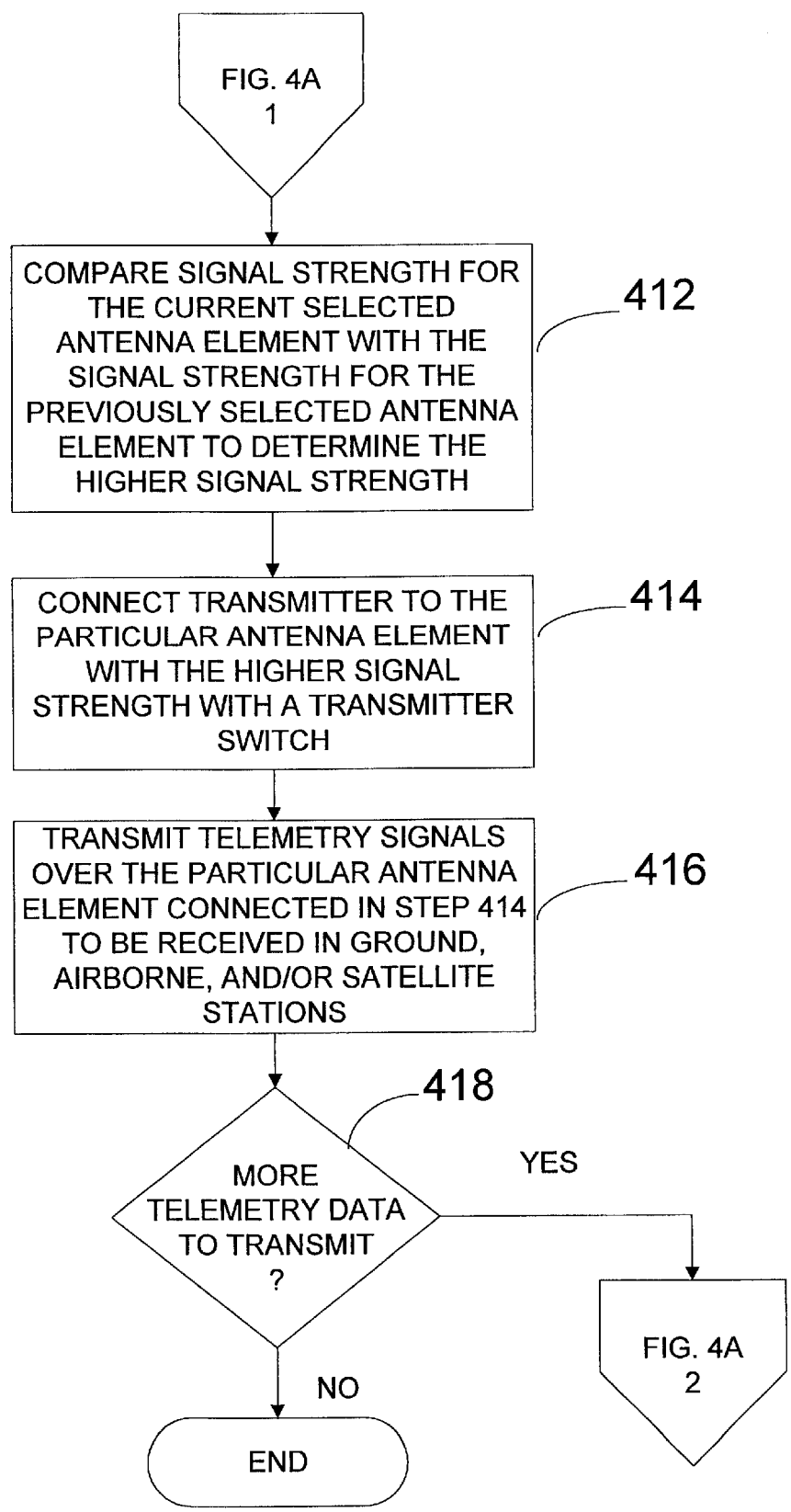

FIGS. 4A and 4B show a flow chart of an embodiment of the method for autonomous two-way radio frequency communication of the present invention for the launch vehicle of FIG. 2 that utilizes modulated RF signals. Referring now to FIGS. 4A and 4B, in step 400 the autonomous two-way radio frequency communication of the present invention starts when one or more antenna elements located on a launch vehicle receive modulated RF signals continuously transmitted from one or more receiving and tracking stations. In step 402 the modulated RF signals received are continuously routed to a receiver through a receiver switch that cycles between the antenna elements. The first modulated RF signal received by the receiver from a first antenna element is demodulated in step 404, and a check is made for a correct handshake bit stream. In step 406 a determination is made if a correct handshake bit stream was detected in the demodulated RF signal. If a correct handshake bit stream is not detected in step 406, in step 410 that signal is disregarded and control returns to step 404 where the modulated RF signal received in a next antenna element connected by the receiver switch is demodulated. If a correct handshake bit stream is detected in step 406, then in step 408 the signal strength for that particular antenna element is determined.

In step 412 the signal strength for the current selected antenna element is compared to the signal strength for the previously selected antenna element to determine which has the higher signal strength. In step 414 transmitter 338 is connected to the antenna element having the higher signal strength identified in step 412 through a transmitter switch.

In step 416 a transmitter transmits telemetry data received from a master data unit through the antenna element having the higher signal strength identified in step 412 to be received in one or more ground stations and/or non-ground stations. In step 418 a determination is made if there is more telemetry data to be transmitted from the launch vehicle. If yes, then control returns to step 404 for demodulation of the modulated RF signal received in the next antenna element connected by the receiver switch. If there is no more telemetry data to be transmitted as determined in step 418, then the autonomous two-way radio frequency communication of the present invention ends.

Figure 5A:
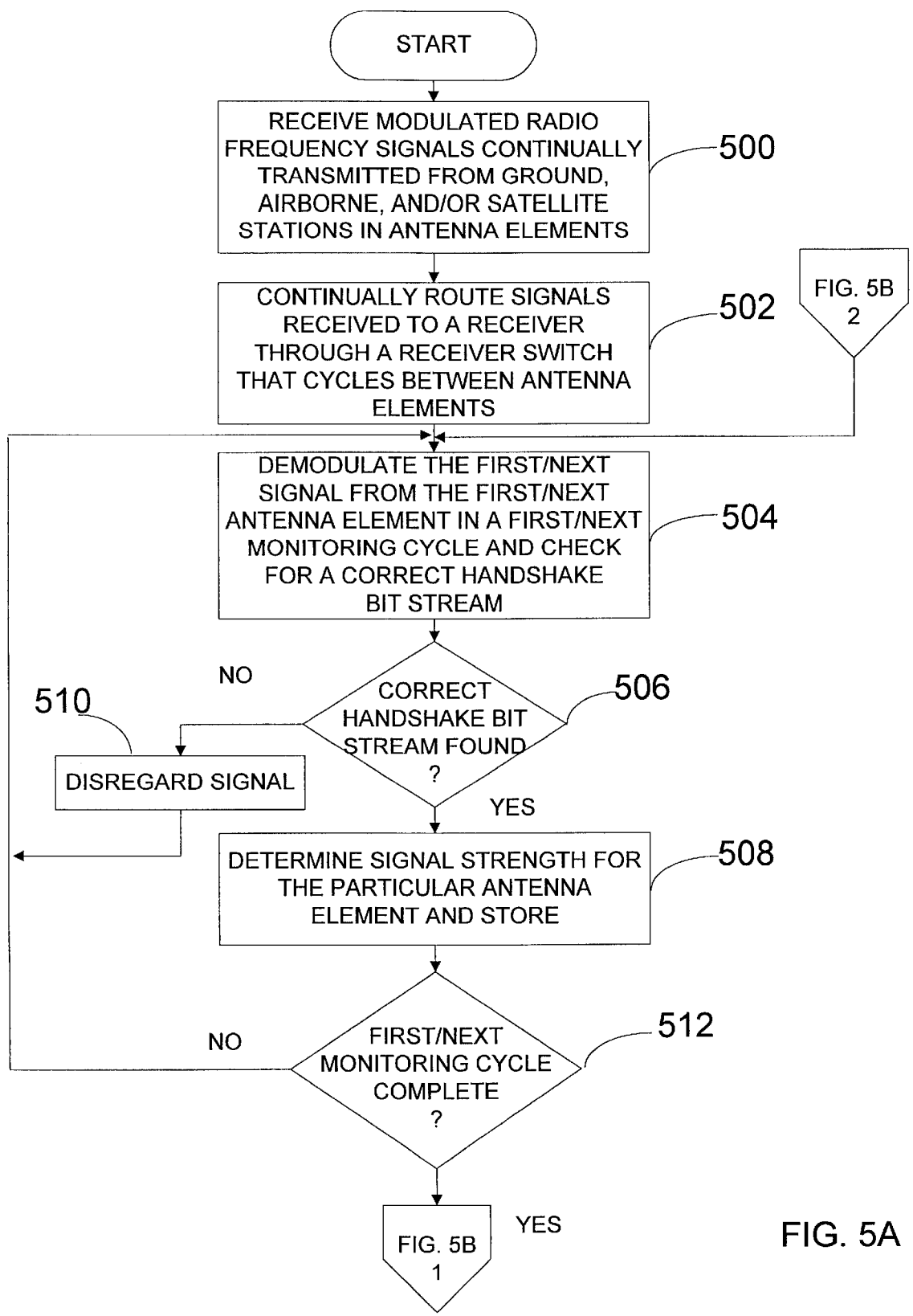
FIGS. 5A and 5B show a flow chart of another embodiment of the method for autonomous two-way radio frequency communication of the present invention for the launch vehicle of FIG. 2 that utilizes modulated RF signals.
Figure 5B:
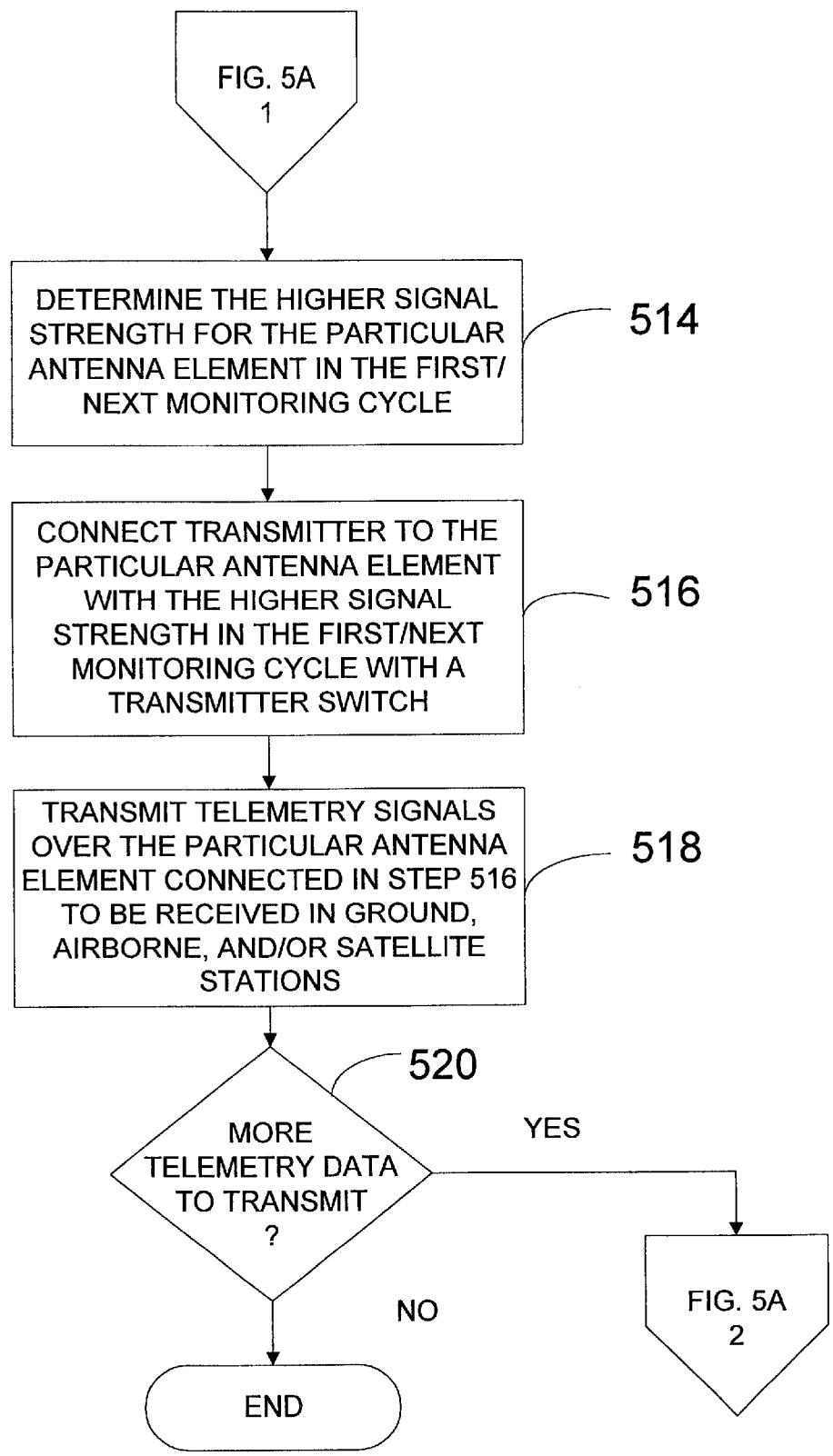

FIGS. 5A and 5B show a flow chart of another embodiment of the method for autonomous two-way radio frequency communication of the present invention for the launch vehicle of FIG. 2 that utilizes modulated RF signals. Referring now to FIGS. 5A and 5B, in step 500 the autonomous two-way radio frequency communications of the present invention starts when one or more antenna elements located on a launch vehicle receive modulated RF signals that have been transmitted from one or more ground stations and/or non-ground stations. In step 502 the modulated RF signals received are continuously routed to a receiver through a receiver switch that cycles between the antenna elements. The first modulated RF signal received by the receiver from a first antenna element is demodulated in step 504, and a check is made for a correct handshake bit stream. In step 506 a determination is made if a correct handshake bit stream was detected in the demodulated RF signal received. If a correct handshake bit stream is not detected in step 506, in step 510 that signal is disregarded and control returns to step 504 where the modulated RF signal received in a next antenna element connected by the receiver switch is demodulated. If a correct handshake bit stream is detected in step 506, then in step 508 the signal strength for that particular antenna element is determined and stored.

In step 512 it is determined if the first monitoring cycle of each antenna element is complete. If the determination in step 512 is that the cycle is not complete, then control returns to step 504 where the modulated RF signal received in the next antenna element and switched by the receiver switch to the receiver is demodulated, and a check is made for a correct handshake bit stream. If the determination in step 512 is that the monitoring cycle is complete, then in step 514 the antenna element in the monitoring cycle that had the higher signal strength is determined. In step 516 a transmitter is connected via a transmitter switch to the antenna element having the higher signal strength as identified in step 514.

In step 518 telemetry data received from a master data unit is transmitted through the antenna element having the higher signal strength as identified in step 514. The telemetry data may be received in one or more ground stations and/or non-ground stations. In step 520 a determination is made if there is more telemetry data to be transmitted from the launch vehicle. If yes, then control returns to step 504 for the next monitoring cycle. If there is no more telemetry data to be transmitted as determined in step 520, then the autonomous two-way radio frequency communication of the present invention ends.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for autonomous two-way radio frequency communications between at least one first station and a second station, wherein the at least one first station is adapted to transmit at least one unique radio frequency signal to the second station, said method comprising the steps of:

(a) transmitting the at least one unique radio frequency signal from the at least one first station;
   (b) receiving the at least one unique radio frequency signal with at least first and second antennas located on the second station;
   (c) determining which of said at least first and second antennas receiving the at least one unique radio frequency signal has a higher signal strength;
   (d) connecting a transmitter located on the second station to one of said at least first and second antennas determined to have received the at least one unique radio frequency signal having said higher signal strength; and
   (e) transmitting using said transmitter a first telemetry signal of monitored parameters of the second station over one of said at least first and second antennas connected to said transmitter.

2. A method according to claim 1 further comprising the step of:

(f) receiving said first telemetry signal of monitored parameters of the second station in the at least one first station determined to have transmitted the at least one unique radio frequency signal received in said at least first and second antennas having said higher signal strength.

3. A method according to claim 2 further comprising the step of:

(g) repeating steps (a) through (f) for a next unique radio frequency signal transmitted from the at least one first station to the second station.

4. A method according to claim 1 wherein said determining step comprises the steps of:

determining a first signal strength for the at least one unique radio frequency signal received in said first antenna; determining a second signal strength for the at least one unique radio frequency signal received in said second antenna; and determining which of said first and second signal strengths is said higher signal strength.

5. A method according to claim 1 wherein said determining step comprises the steps of:

determining a first charge on a first capacitor induced by the at least one unique radio frequency signal received in said first antenna;

determining a second charge on a second capacitor induced by the at least one unique radio frequency signal received in said second antenna; and determining which of said first and second charges has a higher charge, wherein said higher charge indicates which of said at least first and second antennas receiving the at least one unique radio frequency signal has said higher signal strength.

6. A method according to claim 1 wherein the at least one first station is one of a ground station and a non-ground station.

7. A method according to claim 1 wherein the second station is moving relative to the at least one first station.

8. A method according to claim 1 wherein said receiving step comprises the step of:

routing the at least one unique radio frequency signal received in said at least first and second antennas to a receiver through a receiver switch, wherein said receiver switch is connectable between said at least first and second antennas and said receiver.

9. A method according to claim 8 wherein said receiver switch is adapted to switch between said at least first and second antennas.

10. A method according to claim 8 wherein said receiver switch is adapted to transfer the at least one unique radio frequency signal received in said at least first and second antennas to said receiver.

11. A method according to claim 8 wherein said receiving step comprises the steps of:

receiving the at least one unique radio frequency signal in said first antenna;

connecting said first antenna to said receiver with said receiver switch for a selected amount of time;

routing the at least one unique radio frequency signal from said first antenna to said receiver with said receiver switch during said selected amount of time;

receiving the at least one unique radio frequency signal in said second antenna;

connecting said second antenna to said receiver with said receiver switch for said selected amount of time; and routing the at least one unique radio frequency signal from said second antenna to said receiver with said receiver switch during said selected amount of time.

12. A method according to claim 11 wherein said determining step comprises the steps of:

determining a first signal strength for the at least one unique radio frequency signal received during said selected amount of time;

storing said first signal strength in a memory in said processor;

determining a second signal strength for the at least one unique radio frequency signal received in said second antenna during said selected amount of time;

storing said second signal strength in said memory in said processor; and comparing said first signal strength stored in said memory to said second signal strength stored in said memory to determine which of said first and second signal strengths is said higher signal strength.

13. A method according to claim 12 wherein said connecting step comprises the step of:

inhibiting switching between said at least first and second antennas when a change in said higher signal strength between said at least first and second antennas is less than a selected absolute change amount.

14. A method according to claim 1 wherein the at least one unique radio frequency signal is modulated, and said determining step comprises the steps of:

demodulating the at least one unique radio frequency signal received in said at least first and second antennas to detect a correct handshake bit stream;

when said correct handshake bit stream is detected in said demodulating step, determining a first signal strength for the at least one unique radio frequency signal having said correct handshake bit stream received in said first antenna, and determining a second signal strength for the at least one unique radio frequency signal having said correct handshake bit stream received in said second antenna; and comparing said first signal strength with said second signal strength to determine which of said first and second signal strengths is said higher signal strength.

15. A method according to claim 1 wherein said transmitter is connected to one of said at least first and second antennas having said higher signal strength with a transmitter switch.

16. A method according to claim 15 wherein said transmitter switch is adapted to switch between said at least first and second antennas.

17. A method according to claim 15 wherein said transmitter switch is adapted to transfer said first telemetry signal of monitored parameters of the second station from said transmitter to said at least first and second antennas.

18. A method according to claim 1 wherein said transmitting step (g) comprises the steps of:

storing temporarily said first telemetry signal of monitored parameters in a memory buffer when a current higher signal strength of a one of said at least first and second antennas is insufficient to maintain a communication link with the at least one first station; and interleaving said first telemetry signal of monitored parameters stored temporarily in said memory buffer with a subsequent telemetry signal transmitted by said transmitter when said communication link is restored.

19. An apparatus for autonomous two-way radio frequency communications between at least one first station and a second station, wherein the at least one first station is adapted to transmit at least one unique radio frequency signal to the second station, said apparatus comprising:

at least first and second antennas, located on the second station, for at least receiving the at least one unique radio frequency signal transmitted from the at least one first station;

a processor, in communication with said at least first and second antennas, for processing the at least one unique radio frequency signal received in said at least first and second antennas to determine a first signal strength for the at least one unique radio frequency signal received in said first antenna and to determine a second signal strength for the at least one unique radio frequency signal received in said second antenna, and for determining which of said first and second signal strengths is a higher signal strength; and a transmitter for transmitting a plurality of telemetry signals of monitored parameters of the second station, wherein said transmitter is located on the second station and is connectable to said at least first and second antennas and is in communication with said processor, wherein said processor is adapted to direct said transmitter to transmit said plurality of telemetry signals over one of said at least first and second antennas determined to have received the at least one unique radio frequency signal having said higher signal strength.

20. An apparatus according to claim 19 wherein the at least one first station is one of a ground station and a non-ground station.

21. An apparatus according to claim 19 further comprising:
a first capacitor connectable to said first antenna, wherein a first charge is induced in said first capacitor by the at least one unique radio frequency signal received in said first antenna; and
a second capacitor connectable to said second antenna, wherein a second charge is induced in said second capacitor by the at least one unique radio frequency signal received in said second antenna, and further wherein said processor determines which of said first and second charges has a higher charge, wherein said higher charge indicates which of said at least first and second antennas receiving the at least one unique radio frequency signal has said higher signal strength.

22. An apparatus according to claim 19 wherein the second station is moving relative to the at least one first station.

23. An apparatus according to claim 19 further comprising:
a receiver; and
a receiver switch, connectable between said at least first and second antennas and said receiver, for transferring the at least one unique radio frequency signal received in said at least first and second antennas to said receiver.

24. An apparatus according to claim 23 wherein said receiver switch is adapted to switch between said at least first and second antennas.

25. An apparatus according to claim 23 wherein said receiver switch is adapted to transfer the at least one unique radio frequency signal received in said at least first and second antennas to said receiver.

26. An apparatus according to claim 23, wherein said first antenna is connected to said receiver via said receiver switch for a selected amount of time, and then said second antenna is connected to said receiver via said receiver switch for said selected amount of time, the apparatus further comprising:
a memory buffer for storing said first signal strength determined while said first antenna is connected to said receiver for said selected amount of time, and for storing said second signal strength determined while said second antenna is connected to said receiver for said selected amount of time, and for storing said higher signal strength.

27. An apparatus according to claim 23, wherein the at least one unique radio frequency signal is modulated, the apparatus further comprising:
a demodulator connected to said receiver for demodulating the at least one unique radio frequency signal to detect a correct handshake bit stream therein.

28. An apparatus according to claim 19 further comprising:
a transmitter switch, connectable between said at least first and second antennas and said transmitter, for transferring said plurality of telemetry signals transmitted from said transmitter to said one of said at least first and second antennas determined to have received the at least one unique radio frequency signal having said higher signal strength.

29. An apparatus according to claim 28 wherein said transmitter switch is adapted to switch between said at least first and second antennas.

30. An apparatus according to claim 28 wherein said transmitter switch is adapted to transfer said plurality of telemetry signals to said at least first and second antennas.

31. An apparatus according to claim 28 further comprising:
a means for inhibiting said transmitter switch from switching between said at least first and second antennas when a change in said higher signal strength between said at least first and second antennas is less than a selected absolute change amount.

32. An apparatus according to claim 19 further comprising:
a memory buffer in said processor for temporarily storing a portion of said plurality of telemetry signals when a current higher signal strength of said one of said at least first and second antennas is insufficient to maintain a communication link with the at least one first station; and
a means for interleaving said portion of said plurality of telemetry signals temporarily stored in said memory buffer with a subsequent portion of said plurality of telemetry signals transmitted by said transmitter when said communication link is restored.

33. An apparatus for autonomous two-way radio frequency communications between at least one first station and a second station, wherein the at least one first station is adapted to transmit at least one unique radio frequency signal to the second station, said apparatus comprising:
at least first and second antennas, located on the second station, wherein one of said at least first and second antennas is adapted to scan for and receive the at least one unique radio frequency signal transmitted from the at least one first station;
a processor, in communication with said at least first and second antennas, for processing the at least one unique radio frequency signal received in said one of said at least first and second antennas to determine a best quality signal vector for the at least one unique radio frequency signal; and
a transmitter for transmitting a plurality of telemetry signals of monitored parameters of the second station, wherein said transmitter is located on the second station and is connectable to an other of said at least first and second antennas and is in communication with said processor, wherein said processor is adapted to direct said transmitter to transmit said plurality of telemetry signals over said other of said at least first and second antennas which is adapted to beam said plurality of telemetry signals to the at least one first station in a direction parallel to said best quality signal vector.

34. An apparatus according to claim 33 wherein said at least first and second antennas are phased array antennas.

* * * * *